Patented Nov. 9, 1937

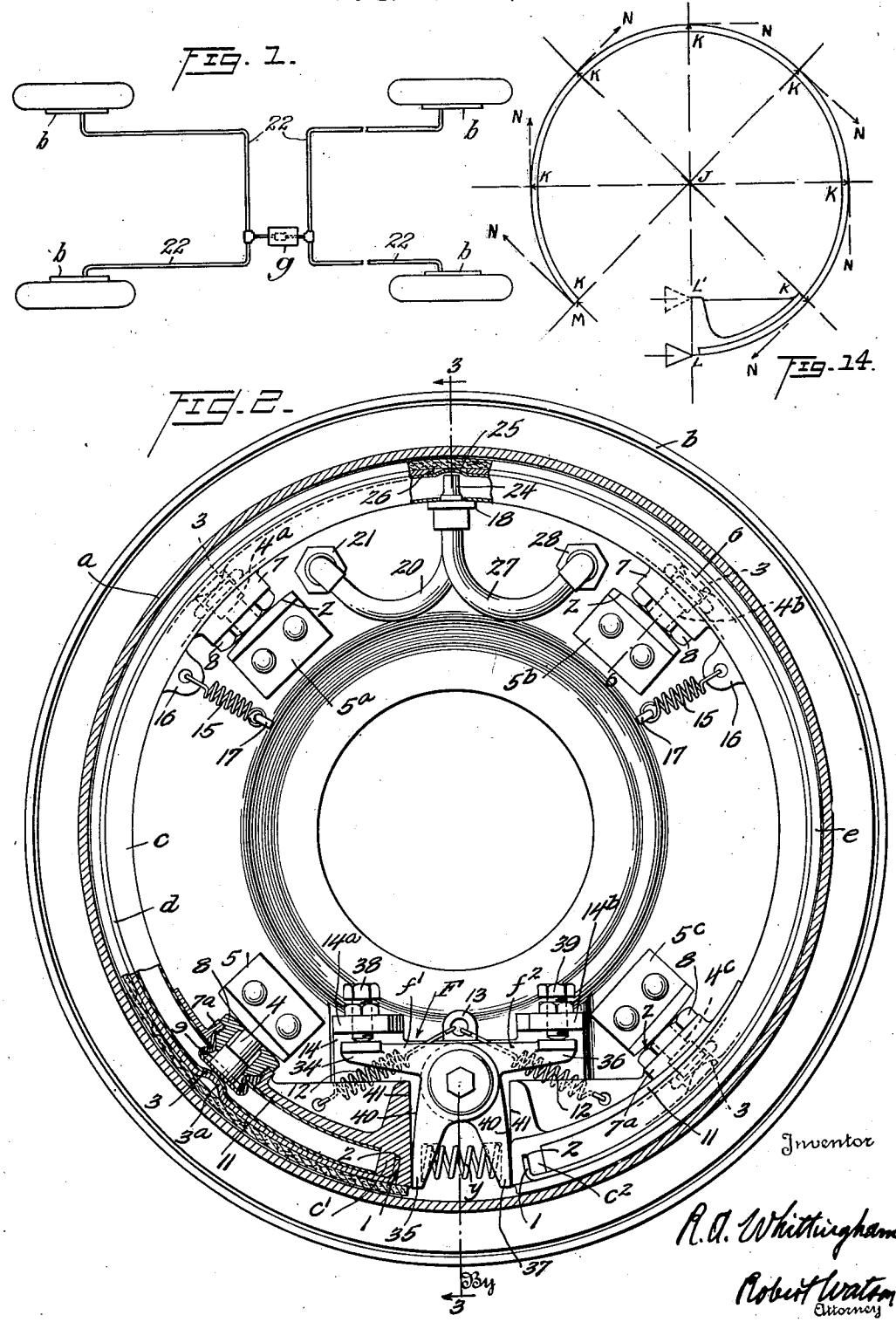

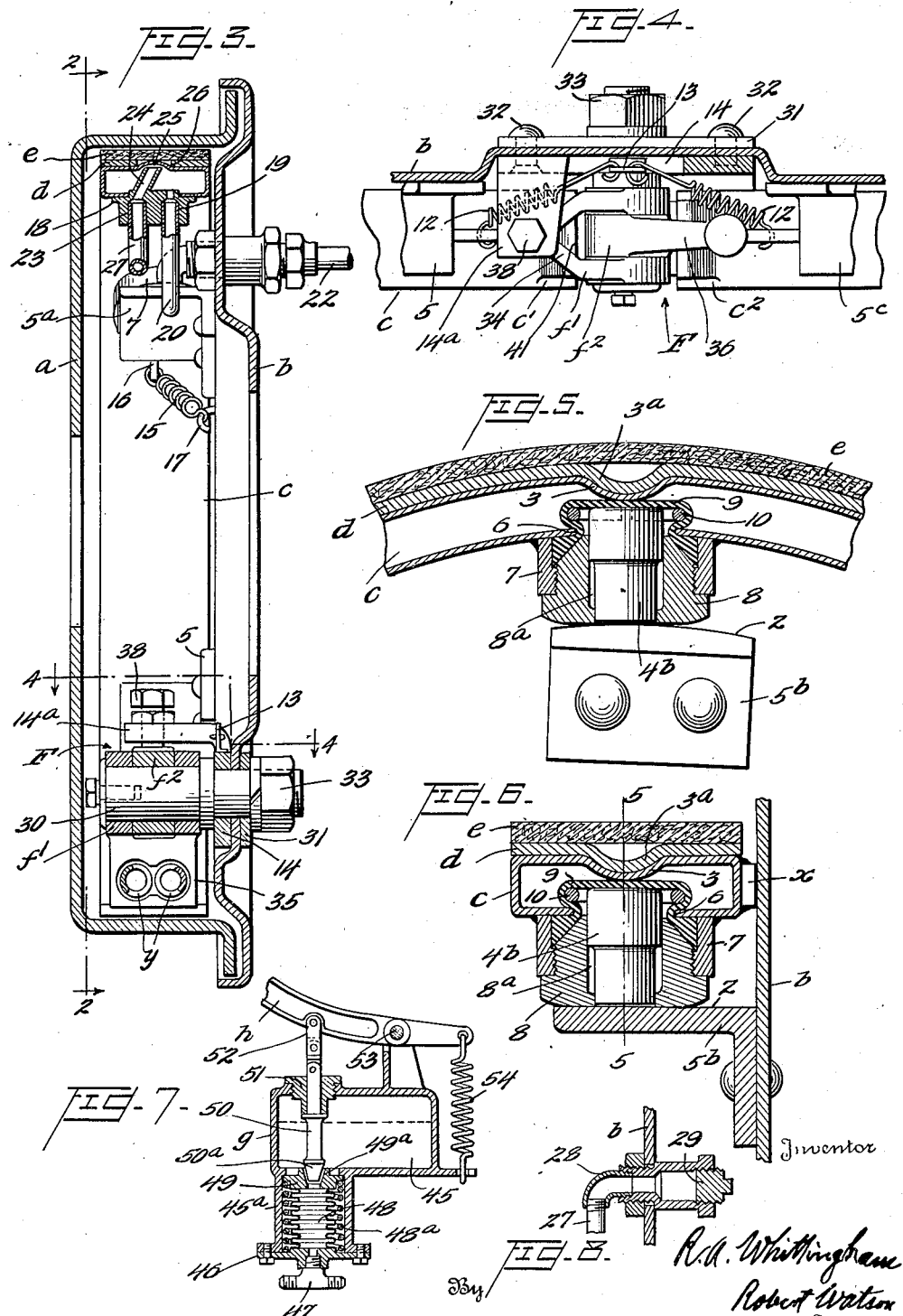

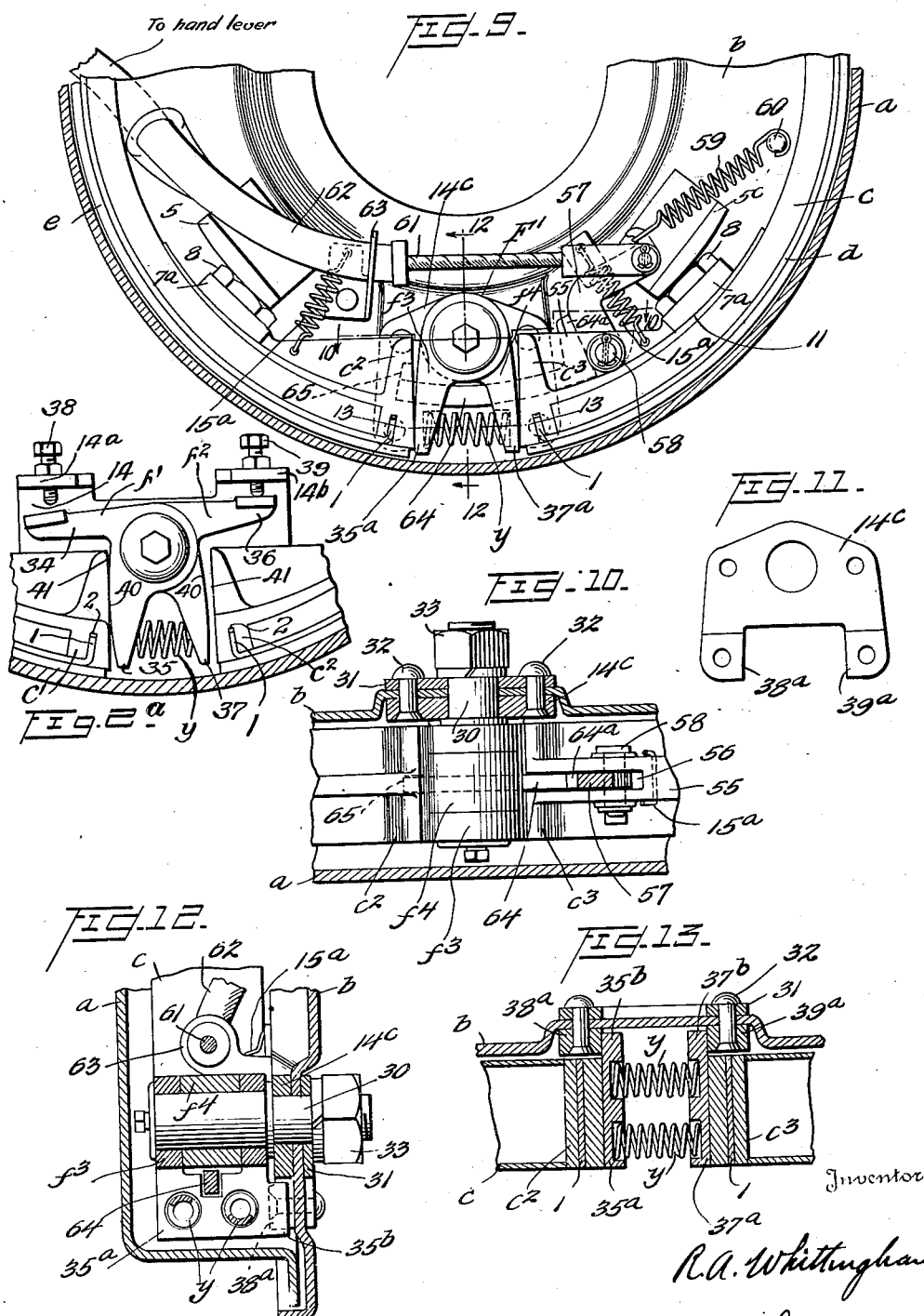

2,098,409

UNITED STATES PATENT OFFICE 2,098,409

VEHICLE BRAKE

Richard A. Whittingham, Perryville, Md.

Application March 29, 1934, Serial No. 718,067

19 Claims. (Cl. 188—152)

My invention embodies two novel features in the construction and operation of internal expanding hydraulic brakes: First, the use of a tubular metal brake shoe endwise movable on its support and constructed as to be capable of radial expansion by the application of fluid pressure to the interior of the shoe created by a master cylinder operated by the usual brake pedal. This feature insures complete and uniform contact and pressure of the brake lining against the drum, which is essential to the fullest development of self-energization.

Second, a stop to limit endwise movement of the shoe, so constructed as to automatically vary the radial distance of the point of engagement of the shoe with the stop according to the magnitude of the thrust received from either shoe end, when the shoe is in contact with the rotating drum. This feature insures that the degree of self-energization shall be in definite relation to the magnitude of the pressure on the pedal and is equally applicable to mechanically operated brakes.

In cooperation, these two features provide for the generation and use of a greater ratio of so-called "self-energization" than is usual with internal hydraulic brakes. These features keep the magnitude of that ratio under the control of pedal pressure and they diminish the length of pedal travel by the reduction, or elimination, of "mechanical advantage" between the pedal and the brake expanding mechanism. In other words, they substitute sufficient controlled self-energization to compensate for the absence of mechanical advantage at the pedal.

In the conventional type of internal expanding brakes only a relatively moderate use is made of the factor of self-energization. This factor is derived from the inertia of the moving vehicle, acting through the length of the frictional contact of the brake shoe or shoes against the moving drum, to build up a higher degree of retardation than is obtainable only from the direct frictional load against the drum, as imposed solely by pedal pressure.

This increment of "induced" retardation, as distinct from "direct" retardation, is a function of three factors, i. e., the length of the brake lining in contact with the drum, the radial distance of the stop, and the coefficient of friction of the brake lining against the drum. A change in the value of any of the factors, results in a greater or less ratio of intensification, regardless of pedal pressure. The length of the brake lining is limited to the length of its circumference, but a fixed radial distance for the stop can be so located as to render the braking effect impracticably severe, especially when only slight retardation is required. It is usual practice, therefore, to locate the stop with such radius as to develop a relatively moderate fixed factor of self-energization and to depend upon pedal action for a sufficiently high shoe pressure against the drum for adequate braking, when multiplied by such fixed factor of self-energization as is practicable for smooth braking at all speeds.

To obtain such brake shoe pressure from a practicable pedal pressure, it is necessary to supply considerable mechanical advantage or leverage ratio between the pedal and the shoe expanding mechanism. The most objectionable features of this arrangement are the corresponding multiplication of the length of pedal movement, the steady increase of that length of movement resulting from lining wear, requiring frequent adjustment of the brake shoes to keep it within practicable bounds, very high fluid pressure in the piping system and high concentrated pressures of the shoes against the drums, often producing drum distortion, scoring and uneven wear of lining. The use of "boosters" and similar accessories to augment pedal pressure only aggravates the condition, with added complication and cost.

If entirely satisfactory braking is sought to be obtained by foot pressure only, it should provide maximum, smooth deceleration from a reasonable pedal pressure and movement, throughout the life of the lining and without periodical adjustment of the brake shoes. It is to this end that it is proposed by the present invention to make a larger use of self-energization and to eliminate, as far as possible, mechanical advantage between pedal and shoes. This cannot be done by making the radial location of the stop a compromise; for if its radius be so short as to provide maximum deceleration from a practicable pedal pressure without mechanical advantage, its action will be too severe for smooth deceleration at low speeds and under light pedal pressure. It is evident, therefore, that if full advantage is to be taken of self-energization, so that it can be substituted, wholly or in part, for mechanical advantage at the pedal, its intensification ratio should be variable and progress from the minimum to the required maximum in direct response to increased pedal pressure, giving, in effect, a definite relation between lining pressures and intensification ratios. Since lining lengths and frictional coefficients are necessarily fixed quantities, the radial distance of the stop should automatically adjust itself, in response to pedal pressure, to provide such drum retardation as may be necessary for the moment; moving from the longest possible radius, for very light pedal pressure, to one sufficiently short to produce the maximum required retardation from maximum pedal pressure.

In the accompanying drawings which illustrate the invention,

Fig. 1 is a diagram showing the pipe connections from the pedal pump or master cylinder to the brakes of a vehicle;

Fig. 2 is a section through a brake drum on the line 2—2 of Fig. 3, showing the brake in side elevation, a part of the brake shoe being shown in longitudinal section;

Fig. 2a is a detail view illustrating the operation of the stop mechanism shown in Fig. 2;

Fig. 3 is a vertical section through the brake drum, dust shield and brake on the line 3—3 of Fig. 2;

Fig. 4 is a section on the line 4—4 of Fig. 3, showing the stop mechanism for the brake shoe in top plan view;

Fig. 5 is a detail sectional view taken longitudinally through the brake shoe, on the line 5—5 of Fig. 6;

Fig. 6 is a section on the line 6—6 of Fig. 1;

Fig. 7 is a vertical section through the master cylinder, the brake pedal being shown in side view partly broken away;

Fig. 8 is a sectional detail view through the fitting to which the outlet tube is connected, a portion of the dust shield being also shown in section;

Fig. 9 is a vertical section through a brake drum, showing the fluid operated brake in side elevation, partly broken away, with a cable connection for operating the brake from the so-called emergency brake lever of a car;

Fig. 10 is a section on the line 10—10 of Fig. 9;

Fig. 11 is a side elevation of the stop plate;

Fig. 12 is a section on the line 12—12 of Fig. 9;

Fig. 13 is a section on the line 13—13 of Fig. 9, and,

Fig. 14 is a diagram illustrating the action of the brake.

Referring to Figures 1 to 8, inclusive, of the drawings, a indicates a brake drum such as is usually attached to a motor vehicle wheel and revolves with the wheel, and b indicates the dust shield which is held stationary on the vehicle. The brake shoe c comprises a resilient seamless steel tube, flat in cross-section, as shown in Figs. 3 and 6, and which extends in almost a complete circle within the brake drum and concentric with its inner face, as shown in Fig. 2. The ends of the tube are closed fluid-tight by light drop forged heads c', c² which are welded to the tube. A metal back band d, which fits against the outer face of the shoe, has overturned ends 1 which extend into notches 2 in the heads. A brake lining e is suitably secured to the band, as by rivets. The back band and lining may be removed from the shoe, after the removal of the wheel and brake drum by springing the ends of the band out of the notches in the fittings and then moving the band sidewise off of the shoe. In order to prevent lateral movement of the band and lining relative to the shoe when the brake is in use, the outer wall of the shoe is semispherically indented midway between its sides, as shown at 3, at several equidistant points in its length, and corresponding indentations 3ª are made in the band, and the indented parts of the latter fit into the indentations in the shoe, as shown in Figs. 2, 5, and 6. The heads on the ends of the shoe engage a stop mechanism F, hereinafter described, which limits the longitudinal movement of the shoe.

The brake shoe is supported with its lining in close proximity to the brake drum by devices which include radially arranged plungers 4, 4ª, 4ᵇ, and 4ᶜ, the inner ends of which rest upon shelves or brackets 5, 5ª, 5ᵇ, and 5ᶜ, respectively, secured to the dust shield. As shown in Figs. 5 and 6, a circular opening 6 is formed in the inner wall of the brake shoe opposite the indented part 3 in the outer wall, and an internally threaded collar 7 is welded to the inner wall and is concentric with the opening. A nut 8 is threaded into the sleeve and has a central bore 8ª in which the plunger 4ᵇ is guided. A flexible diaphragm 9, clamped at its edges between the nut and collar and the wall of the shoe, extends through the opening in the shoe and over the inner end of the plunger, closing the opening in the shoe fluid-tight. A split ring 10 may be inserted through the opening in the shoe to spread the diaphragm so that it will lie flat against the end of the plunger and will not crumple against its side. The surface z of the bracket upon which the plunger rests is curved in the arc of a circle which is concentric with the axis of the brake shoe and drum, so that when the shoe moves longitudinally the plunger and nut may slide on the bracket without radial movement. The mounting of the plunger 4ª and its diaphragm is identical with that of the plunger 4ᵇ and its diaphragm 9, and the mounting of the plungers 4 and 4ᶜ are the same, except that the collars 7ª, instead of being welded directly to the shoe like the collars 7, are integral with extensions 11 of the shoe heads c' and c² which are welded to the shoe. Springs 12, extending from the shoe heads to an eye 13 on a plate 14 fixed to the dust shield normally hold the shoe heads against the stop mechanism and also hold the end portions of the shoe away from the brake drum. Other springs 15, adjacent the brackets 5ª and 5ᵇ, extend radially from eyes 16, welded to the brake shoe, to hooks 17, secured to the dust shield. These springs also tend to pull the brake shoe inwardly away from the brake drum. The shoe is spaced from the dust shield by several short metal spacing blocks x which are soldered or welded to a side wall of the tube as illustrated in Fig. 6.

The inner wall of the brake shoe, at its highest point, has an opening over which extends a fitting 18, welded to the shoe and having an opening 19 in which is fitted one end of a flexible pipe 20, the other end of which is connected to a tubular fitting 21 extending through and fastened to the dust shield. A pipe 22 is connected to the latter fitting and this pipe leads to a pedal-operated "master cylinder" g, Figs. 1 and 7, by means of which liquid may be forced through the inlet pipe into the shoe. The fitting 18 also has an opening 23, and a tube 24, integral with the fitting, extends upwardly from the latter opening to a recess in the topmost part of the shoe, this recess being formed by an outwardly pressed part 25 of the outer wall of the shoe which extends into an opening 26 in the back band d. A flexible outlet pipe 27 extends from the opening 23 to a tubular fitting 28, Figs. 2 and 8, which is secured to the dust shield and which is normally closed by a plug 29.

The shoe is filled with liquid by removing the plug 29 and operating the plunger of the master cylinder which forces the liquid into the shoe through the inlet pipe 20 while the air in the shoe escapes through the outlet pipe 27, and after the air has been driven out and the shoe and its connections are completely filled with liquid, the plug 29 is inserted in the outlet fitting. Thus the pipe leading from the master cylinder to the shoe, and the shoe itself, being completely filled with liquid, any pressure applied to the liquid by the operation of the pedal master cylinder is transmitted to the interior of the shoe. Since the area of the inner wall is materially less than that of the outer wall by reason of the openings 6, and since the plungers, resting against the brackets, cannot be displaced by the liquid pressure, the shoe is forced outward by liquid pressure which is applied equally and radially against its outer wall throughout the length of the shoe.

The stop mechanism F comprises two bell crank levers $f'$ and $f^2$ journaled upon an anchor bolt 30 which is firmly secured to the dust shield. As shown, the plate 14 on the inner side of the dust shield and a plate 31 on the outer side of the shield are arranged parallel with one another and secured to the shield by rivets 32 and the bolt is extended through openings in these plates and the dust shield and secured by a nut 33. The bell crank lever $f'$ has a horizontal arm 34 and a downwardly extending arm 35 and the bell crank lever $f^2$ has a horizontal arm 36 and a downwardly projecting arm 37. As shown in the drawings, the lever $f'$ is divided at its central portion and the hub of the lever $f^2$ fits in the opening thus formed. The horizontal arm of the lever $f'$ extends under an adjustable stop 38 in the form of a screw threaded into a bracket arm 14$^a$ projecting from the plate 14, and the horizontal arm of the lever $f^2$ extends under a similar adjustable stop 39 in a bracket arm 14$^b$ projecting from said plate. The opposing faces of the lower arms 35 and 37 are wide and formed with sockets to receive the ends of two compression springs $y$ which press these arms apart and normally hold the horizontal arms against the adjustable stop screws. The outer faces 40 of the lever arms 35 and 37 are convexly curved while the end faces 41 of the heads $c'$ and $c^2$ on the shoe are straight and substantially parallel. These heads extend upwardly to points at opposite sides of the anchor bolt 30 and the arms 35, 37 extend downwardly to the lower ends of the faces 41.

The bolt, which is a positive stop, is placed at a distance from the axis of the brake drum and support determined by the maximum braking effect desired with the maximum pressure applied to the fluid in the brake shoe. The lever arms 35 and 37 constitute yielding radial extensions of the stop for producing a lighter braking effect, with less pressure in the shoe. When the brake is off, the faces 41 of the heads of the shoe are engaged by the lower ends of the arms 35 and 37. If the brake shoe is applied to the drum while the latter is rotating in the counter-clock-wise direction, in Fig. 2, the shoe will move endwise in the same direction and the lever $f'$ will be rocked, by the endwise pressure of the shoe, compressing the springs $y$ against the lever $f^2$, which is held immovable by the stop 39. If the brake shoe is applied lightly to the drum by the pressure of the liquid there will be but little movement of the lever $f'$ and the endwise pressure of the shoe will be applied near the lower end of the arm 35; but if the shoe is applied to the drum with greater force by the pressure of the fluid the lever will be rocked by a greater endwise pressure of the shoe and the straight face 41 of the shoe head $c'$ will engage the convex face 40 of the lever at a point higher up on the arm, and when the shoe is applied to the drum with the maximum fluid pressure, the upper end of the shoe head will engage the upper end of the arm 35 on a horizontal line passing through the center of the bolt, as illustrated in Fig. 2a. Thus it will be seen that the contact point of the shoe head with the stop mechanism shortens radially with increased fluid pressure in the shoe, causing an increase in the self-energization of the brake elements, and lengthens radially with decreased fluid pressure in the shoe, decreasing the self-energization of the brake elements. If the brake drum is rotating in the clock-wise direction when the brake shoe is applied, the shoe will move in the clock-wise direction and apply pressure to the lever $f^2$ which will be transmitted through the springs $y$ to the lever $f'$ which is held immovable by the stop 38. Since the face 41 of the head $c^2$ is straight and the face 40 of the lever $f^2$ is convex, like the corresponding faces on the head $c'$ and lever $f'$, the braking action will be like that which occurs when the drum is rotating in the clock-wise direction as above described. In both directions of rotation the point of contact of the shoe with the stop mechanism is variable and is automatically adjustable in response to the pressure of the fluid in the shoe, created by the operation of the master cylinder, associated with the brake pedal.

To clarify the effect of what commonly is called self-energization in an internal band brake, it may be defined as the amount by which the tangential reacting force, or braking torque, at the stopped end of the band exceeds the tangential actuating force at the free end, when the band is in frictional contact with a rotating drum. Usually it is expressed in terms of the ratio of one to the other. The acuating force may be applied from any exterior source, but the amplifying force, producing self-energization is derived from the frictional drag of the rotating drum on the band and hence originates in the inertia of the moving vehicle, as described below.

Fig. 14 shows diagrammatically a non-rotatable brake band assumed to be floating within a clockwise rotating drum (not shown) and to be capable of radial expansion into contact therewith by a small actuating force M to take up the clearance. Upon contact with the drum, any increase in the actuating or primary force M develops complete frictional pressure of the band against the drum that instantly induces the action of the amplifying or secondary force N from the drag of the drum. That force, being developed by frictional pressure, modified by a frictional coefficient, is proportionate to the primary force M but is increased progressively in effect from M to L. The net result is the establishment of a ratio of the actuating force M to the much greater reacting force L. The value of that ratio depends upon structural details involving three components which are fixed quantities; they are (1) the length of the band in contact with the drum, (2) the radial distance of the stop or anchor point L and (3) the co-efficient of friction between the band and the drum.

Inspection of Fig. 14 shows that when force N is brought into action it exerts a continuous tangential pull at every point on the band from M to L, acting about the axis J through an infinite series of radial lever arms JK to force the band into greater pressure against the drum, with the stop L as a fulcrum point. The value of N at any given point on the band depends upon its peripheral distance from M, due to the geometrically progressive increase of band pressure against the drum; its effect in band pressure equals $$N\frac{JK+JL}{JL}$$

The ratio of the two end forces M and L is found from the equation hyperbolic logarithm of $$R=\frac{a}{b}c$$

in which
R is the ratio sought
$a$ is the length of the continuous band in inches.
$b$ is the radius of the stop in inches
$c$ is the co-efficient of friction.

Although the foregoing is elementary and well-known in the art, it is recited to emphasize the importance of the stop radius in finally qualifying the value of the other two components that determine the energization ratio. For example, assuming a drum 14 inches in diameter, continuous brake lining 42 inches in length, a stop (L, Fig. 14) with a maximum radius of 6¾ inches and a frictional co-efficient of 0.4, then the ratio of the end forces M and L would be 1 to 12 in round figures. Assuming the stop radius to be shortened (L', Fig. 14) by 2 inches to 4¾ inches the ratio then would be 1 to 35, if the brake lining and drum surface should be in perfect condition. Therefore, there is an amplification range of from 12 to 35 times the actuating force D available, if the stop radius can be made to vary its length in response to varying pedal pressure.

In Fig. 7 is shown the master cylinder $g$ which I have provided, in association with the brake pedal $h$, for applying pressure to the liquid in the brake shoes. As shown, the master cylinder comprises a reservoir 45 having a downwardly extending cylindrical extension or well 45$^a$, the lower end of which is closed by a cap 46 having a central opening in which is threaded a T pipe-fitting 47 to which the pipes 22 leading to the various brake shoes are connected. Within the well, and concentric with its side wall, is arranged a bellows 48 of resilient metal, annularly corrugated, the cap 46 constituting the lower end of the bellows and a cap 49 constituting its upper end. A spring 48$^a$ normally holds the bellows in the expanded position with the upper cap against a ledge on the floor of the reservoir, as shown. The cap 49 has a central downwardly tapering opening 49$^a$ which forms a seat for a tapering valve 50$^a$ on a valve stem 50 which is vertically movable in a bushing 51 threaded into an opening in the upper arm of the reservoir. This rod is connected by a link 52 to the brake pedal lever $h$ at one side of its pivot 53, and a spring 54 connected to the lever at the opposite side of the pivot constantly tends to hold the longer arm of the lever in an upper position, in which the valve 50$^a$ is held away from the seat in the bellows cap. When the brake system is in working order the shoes, connecting pipes and bellows are full of liquid and the reservoir is full up to the dotted line in Fig. 7. When the pedal is depressed to set the brakes, the valve first closes the port in the upper cap of the bellows and the bellows is then compressed by the further downward movement of the valve stem. As a solid column of liquid extends from the bellows to each brake shoe and as the shoes are also full of the liquid, it will be seen that the pressure applied to the brake pedal will be transmitted directly to the shoes and since the linings of the shoes are close to the drums throughout their lengths, a short movement of the pedal will cause the shoes to engage the drums. In this operation the liquid pressure in the shoe is applied to the stationary plungers 4, 4$^a$, 4$^b$, and 4$^c$ and to the outer wall of the shoe, which has a greater area than the inner wall and since the plungers, resting against the shelves 5, 5$^a$, etc., cannot be displaced by the liquid pressure, the shoe is forced outward by liquid pressure which is applied equally and radially against its outer wall as previously stated. When the operator relieves the pressure on the brake pedal, the spring 54 returns it to normal position and causes the valve 50$^a$ to be lifted from its seat in the bellows cap. The bellows, which is submerged in the liquid, is then expanded by the spring 48$^a$ and since the opening of the valve establishes communication between the reservoir and bellows, the bellows will always be filled with liquid.

The shoe in Figs. 9-13 is the same as the shoe in the previously described figures and operates by fluid pressure in the same manner, but I have shown also means by which the shoe may be operated mechanically from the so-called emergency brake lever with which motor cars are usually equipped. This latter means will usually be employed for locking the brakes when the vehicle is stopped. In Fig. 2, the horizontal arms of the stop levers $f'$ and $f^2$ engage adjustable stops 38 and 39, respectively, which limit the movements of the levers; in Fig. 9 an alternate means for limiting their movement is shown. In Fig. 9, the levers $f^3$ and $f^4$ of the stop mechanism F' have only the vertical arms 35$^a$ and 37$^a$, these arms having lateral projections 35$^b$ and 37$^b$, respectively, which engage fixed stops 38$^a$ and 39$^a$ on a plate 14$^c$ secured to the dust shield and through which the anchor bolt extends.

The heads $c^2$ and $c^3$ of the brake shoe are changed slightly from the heads shown in the previously described figures in order to accommodate the mechanical devices for forcing the shoe ends apart to set the brake. The web 55 of the shoe head $c^3$ has a longitudinal slot 56 in which is fitted one end of an elbow lever 57, pivoted on a pin 58 which extends through the web. A spring 59 connects the upper arm of this lever with a pin 60 secured to the dust shield. A cable 61, pivotally connected to the upper arm of the lever, extends to the emergency brake lever of the vehicle (not shown) and by means of the brake lever the elbow lever 57 may be rocked in opposition to the tension of the spring. As shown, the cable is movable in a flexible guide tube 62 which extends through and is suitably supported within the dust shield, as by means of a bracket 63. A flat thrust-bar or rod 64 has one end extending into a recess 65 in the front of the shoe head $c^2$ and the other end extending into the slot 56 in the web of the shoe head $c^3$, and this bar has an upstanding head 64$^a$ which rests against the lower arm of the elbow lever, as shown in Fig. 9. Springs 15$^a$ supplement the springs 15 (Fig. 2) in normally holding the shoe away from the drum.

Normally, the parts are as shown in Fig. 9. When the operator pulls the lever to manually set the brakes, the elbow lever is rocked to the left in said figure and this lever serves as a cam to force the thrust-bar to the left against the shoe head $c^2$ and by this means both heads are forced away from the stop levers and the shoe is expanded against the drum. If the vehicle is not in motion the shoe heads will remain away from the stop levers and the brake will remain set until the operator moves the brake to release the tension on the cable, when the spring 59 will pull the elbow lever back to normal position and the thrust-bar will follow the lever, thus allowing the heads of the brake shoe to approach one another so that the shoe may contract radially away from the drum.

Ordinarily the braking of the vehicle wheels while in motion will be accomplished by depression of the brake pedal, causing the pump or master cylinder to apply pressure to the fluid within the shoe, and the setting of the brake by means of the emergency lever and cable will ordinarily be accomplished for the purpose of locking the wheels when the vehicle is stopped; but the brake may be applied by operating the cable while the vehicle is moving and if it is so applied without the fluid pressure, the brake shoe will move endwise in the direction of rotation of the brake drum and the leading head of the shoe will bear on the convex surface of the adjacent stop lever near the lower end of the latter or closer to the axis of the anchor bolt according to the force with which the shoe is applied to the drum. It will be evident that either method of setting the brake may be used independently or that both methods may be used at the same time, without interference. The cam mechanism shown for expanding the brake shoe is only illustrative and any other suitable means may be employed for the purpose that does not interfere with the operation of the shoe by fluid pressure.

The invention makes possible the adequate braking of all classes of motor propelled vehicles by moderate foot pressure, with only a short pedal travel and without the use of "boosters" or other auxiliary devices, for adding a pull to the pedal pressure. The internal hand brake, with its uniform and practically complete drum contact, can be designed to develop so great a factor of self-energization that a light touch on the pedal, even without mechanical advantage, will lock the wheel. Some means must be provided to control the action of the brake so as to bring the retarding effect of self-energization into predetermined ratio with pedal pressures. This is accomplished by the stop mechanism.

Adaptation to all vehicles, from the lightest to the heaviest, is practicable from the flexibility of the design. All the variables,—which comprise mechanical advantage at the pedal, length of lining, coefficient of friction, range of self-energization and resistance of the cam springs,—can be varied with relation to each other, so as to produce such retarding effort as may be necessary, with so short a pedal travel that the lining can be worn out by pedal movement only, without periodical adjustment. It is to be noted that the shoe is full floating and always makes uniform contact with the drum, regardless of tapering wear. The detachable back band provides for reversing the lining when worn down toward one end, which greatly lengthens its useful life. Relining is quickly and inexpensively accomplished by springing off and discarding the old back band and snapping on a new one.

What I claim is:

1. In a fluid operated brake, a rotatable brake drum, a brake shoe support, a resilient tubular brake shoe within the drum and endwise movable on the support, means for forcing fluid into the shoe, means associated with the shoe for causing the shoe to expand radially into contact with the drum by the fluid pressure in the shoe, and a stop on the support for limiting the endwise movement of the shoe.

2. In a fluid operated brake, a rotatable brake drum, a support adjacent the drum, a flat tubular brake shoe within the drum and endwise movable on the support, the inner wall of the shoe having spaced openings therein which materially reduce the area of said wall, radially arranged plungers carried by the shoe, said plungers resting against said support and extending into said openings, means for forcing fluid into the shoe to cause it to expand radially into contact with the drum, and a stop on the support for limiting the endwise movement of the shoe.

3. In a fluid operated brake, a rotatable brake drum, a support adjacent the drum, a flat tubular brake shoe within the drum and endwise movable on the support, the inner wall of the shoe having spaced openings therein which materially reduce the area of said wall, flexible diaphragms closing said openings, radially arranged plungers carried by the shoe and extending between said diaphragms and the support, means for forcing fluid into the shoe to cause it to expand radially into contact with the drum, and a stop on the support for limiting the endwise movement of the shoe.

4. In a fluid operated brake, a rotatable brake drum, a brake shoe support, a resilient tubular brake shoe within the drum and endwise movable on the support, means for forcing fluid into the shoe, means associated with the shoe for causing the shoe to expand radially into contact with the drum by the fluid pressure in the shoe, and a stop on the support for limiting the endwise movement of the shoe, said shoe adapted to bear against the stop at a radial distance from the axis of the drum which shortens with increased end thrust of the shoe and lengthens with decreased end thrust of the shoe.

5. In a fluid operated brake, a rotatable brake drum, a brake shoe support, a resilient tubular brake shoe within the drum and endwise movable on the support, means for forcing fluid into the shoe, means associated with the shoe for causing the shoe to expand radially into contact with the drum by the fluid pressure in the shoe, and a stop on the support for limiting the endwise movement of the shoe, said shoe adapted to bear against the stop at a radial distance from the axis of the drum which shortens with increased end thrust of the shoe and lengthens with decreased end thrust of the shoe in either direction of rotation of the drum.

6. In a brake, a rotatable brake drum, a support, a brake shoe within the drum and endwise movable on the support by frictional contact with the drum due to rotation thereof, means for forcing the shoe into engagement with the drum, and a stop on the support for limiting the endwise movement of the shoe, said shoe adapted to bear against the stop at a radial distance from the axis of the drum which shortens with increased end thrust of the shoe and lengthens with decreased end thrust of the shoe.

7. In a brake, a rotatable brake drum, a support, a brake shoe within the drum and endwise movable on the support by frictional contact with the drum due to rotation thereof, means for forcing the shoe into engagement with the drum, and a stop on the support for limiting the endwise movement of the shoe, said shoe adapted to bear against the stop at a radial distance from the axis of the drum which shortens with increased end thrust of the shoe and lengthens with decreased end thrust of the shoe, in either direction of rotation of the drum.

8. In a brake, a rotatable brake drum, a support, a brake shoe within the drum and endwise movable on the support by frictional contact with the drum due to rotation thereof, and a stop on the support adapted to receive the end-thrust of the shoe, said stop comprising a member fixed to the support at a radial distance from the axis of the drum determined by the maximum braking resistance desired and adapted to limit the movement of the shoe, and a member adapted to apply a yielding resistance to the thrust of the shoe at a greater radial distance from said axis and in advance of the stoppage of the shoe by said fixed member.

9. In a brake, a rotatable brake drum, a support, a brake shoe within the drum and endwise movable on the support by frictional contact with the drum due to rotation thereof, said shoe having an inwardly projecting head at one end, means for forcing the shoe into engagement with the drum, and a stop on the support comprising a fixed member secured to the support at a certain radial distance from the axis of the drum adapted to receive the thrust of the inner part of the shoe head to stop the movement of the shoe, and a spring-pressed arm extending from said fixed member to a greater radial distance from said axis adapted to bear against the outer part of the head at the commencement of the endwise movement of the shoe.

10. In a brake, a rotatable brake drum, a support, a brake shoe within the drum and endwise movable on the support, means for forcing the shoe into engagement with the drum and a stop on the support adapted to receive the end-thrust of the shoe, said stop comprising a member fixed to the support at a certain radial distance from the axis of the drum and a movable arm extending from said fixed member to a greater radial distance from the axis of the drum and spring-pressed toward one end of the shoe, the adjacent surfaces of said arm and shoe end being so formed that the point of contact of the former with the latter will move inwardly with increased end thrust of the shoe and outwardly with decreased end thrust of the shoe.

11. In a brake, a rotatable brake drum, a support, a brake shoe within the drum and endwise movable on the support, said shoe having an inwardly projecting head at one end, means for forcing the shoe into engagement with the drum and a stop on the support comprising a fixed member secured to the support at a certain radial distance from the axis of the drum adapted to be engaged by the inner part of the shoe head to stop the movement of the shoe, and a spring-pressed arm extending from said fixed member to a greater radial distance from said axis adapted to bear against the outer part of the head at the commencement of the endwise movement of the shoe, the adjacent surfaces of said arm and shoe head being so formed that the point of contact of the former with the latter will move inwardly with increased end thrust of the shoe and outwardly with decreased end thrust of the shoe.

12. In a brake, a rotatable brake drum, a support, a brake shoe within the drum and endwise movable on the support by frictional contact with the drum due to rotation thereof, said shoe having an inwardly projecting head at one end, means for forcing the shoe into engagement with the drum and a stop on the support comprising a fixed member secured to the support at a certain radial distance from the axis of the drum in the path of movement of the inner part of the shoe head adapted to stop the movement of the shoe, and a spring-pressed arm extending from said fixed member to a greater radial distance from said axis adapted to bear against the outer part of the head at the commencement of the endwise movement of the shoe, the end of the shoe head being straight and the adjacent face of the arm being convex whereby the point of engagement of the arm with the shoe head varies with variations in the thrust of the shoe.

13. In a brake, a rotatable brake drum, a support, a brake shoe extending in almost a complete circle within the drum and endwise movable on the support by frictional contact with the drum due to rotation thereof, means for forcing the shoe into engagement with the drum, and a stop on the support between the ends of the shoe, said shoe adapted to bear against the stop at a radial distance from the axis of the drum which shortens with increased end thrust of the shoe and lengthens with decreased end thrust of the shoe in either direction of rotation of the drum.

14. In a brake, a rotatable brake drum, a support, a brake shoe extending in almost a complete circle within the drum and endwise movable on the support by frictional contact with the drum due to rotation thereof, means for forcing the shoe into engagement with the drum, and a stop on the support between the ends of the shoe, said stop comprising a member fixed to said support at a certain radial distance from the axis of the drum and movable arms extending from said fixed members to a greater radial distance from the axis of the drum and spring-pressed in opposite directions against the ends of the shoe.

15. In a brake, a rotatable brake drum, a support, a brake shoe extending in almost a complete circle within the drum and endwise movable on the support, means for forcing the shoe into engagement with the drum, and a stop on the support between the ends of the shoe, said stop comprising a member fixed to said support at a certain radial distance from the axis of the drum and movable arms extending from said fixed members to a greater radial distance from the axis of the drum and spring-pressed in opposite directions against the ends of the shoe, the adjacent surfaces of said arms and shoe being so formed that the point of contact of the former with the latter will move inwardly with increased end thrust of the shoe and outwardly with decreased end thrust of the shoe.

16. In a brake, a rotatable brake drum, a support, a brake shoe within the drum and endwise movable on the support, means for forcing the shoe into engagement with the drum, and a stop on the support for limiting the endwise movement of the shoe, said stop comprising a member secured rigidly to the support at a determined radial distance from the axis of the drum, a pivoted arm extending from said member to a greater radial distance from said axis and a spring for forcing said arm toward the shoe end, said arm and shoe end having co-engaging surfaces so formed that the pressure of the shoe will be applied to the arm at varying distances from its axis according to the magnitude of the thrust of the shoe.

17. In a hydraulic brake, a rotatable brake drum, a brake shoe support, a brake shoe within the drum and endwise movable on the support, said shoe comprising a flat seamless metal tube having heads at its ends, said heads having transverse notches, a metal back band detachably mounted on the shoe and having overturned ends engaging said notches, and a brake lining secured to said band.

18. In a hydraulic brake, a rotatable brake drum, a support having surfaces within the drum concentric therewith, a tubular brake shoe, closed at its ends and having openings in its inner wall, collars attached to the shoe and surrounding said openings, flexible diaphragms closing said openings, nuts threaded into said collars and clamping the margins of the diaphragms, each nut having a guide-opening, and plungers within said guide-openings, the inner ends of the plungers bearing against said surfaces of the support.

19. In a hydraulic brake, a rotatable brake drum, a brake shoe support, a brake shoe within the drum and endwise movable on the support by frictional contact with the drum due to rotation thereof, said shoe comprising a flat, resilient, seamless metal tube closed at its ends, and flexible inlet and outlet tubes secured to the support and communicating with the interior of the shoe.

RICHARD A. WHITTINGHAM.